United States Patent
Hiramatsu

(10) Patent No.: US 10,094,711 B2
(45) Date of Patent: Oct. 9, 2018

(54) SPECTROMETER AND INTEGRATING SPHERE

(71) Applicant: SHIMADZU CORPORATION, Kyoto-shi, Kyoto (JP)

(72) Inventor: Takahide Hiramatsu, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 12 days.

(21) Appl. No.: 15/300,329

(22) PCT Filed: Apr. 1, 2014

(86) PCT No.: PCT/JP2014/059660
§ 371 (c)(1),
(2) Date: Sep. 29, 2016

(87) PCT Pub. No.: WO2015/151233
PCT Pub. Date: Oct. 8, 2015

(65) Prior Publication Data
US 2017/0146398 A1    May 25, 2017

(51) Int. Cl.
*G01J 3/02*        (2006.01)
*G01J 3/42*        (2006.01)

(52) U.S. Cl.
CPC .......... *G01J 3/0254* (2013.01); *G01J 3/0248* (2013.01); *G01J 3/0278* (2013.01); *G01J 3/42* (2013.01)

(58) Field of Classification Search
CPC .......... G01J 3/0254; G01J 3/42; G01J 3/0278; G01J 3/0248
See application file for complete search history.

(56) References Cited

U.S. PATENT DOCUMENTS 5,369,481 A * 11/1994 Berg ................... G01J 3/02
                                                    250/228
6,424,413 B1 * 7/2002 Weber .................. G01J 3/0251
                                                    250/228
(Continued)

FOREIGN PATENT DOCUMENTS

EP        0 569 104 A1    11/1993
EP        0 964 244 A1    12/1999
(Continued)

OTHER PUBLICATIONS

Communication dated Mar. 27, 2017, from the European Patent Office in counterpart European application No. 14888029.7.
(Continued)

*Primary Examiner* — Dominic J Bologna
(74) *Attorney, Agent, or Firm* — Sughrue Mion, PLLC

(57) ABSTRACT

An integrating sphere for a spectrometer, including: an integrating spherical body with a light entrance window for allowing an entry of light emitted from a sample, a first light detection window, and a second light detection window; a first detector attachment section located on the outside of the first light detection window; and a second detector attachment section located on the outside of the second light detection window in such a manner that the detection field of a detector to be attached to the second detector attachment section coincides with the detection field of a detector to be attached to the first detector attachment section.

12 Claims, 4 Drawing Sheets

(56) References Cited

U.S. PATENT DOCUMENTS

| | | | |
|---|---|---|---|
| 2002/0024664 A1* | 2/2002 | Yokota | G01J 1/04 356/319 |
| 2002/0193671 A1* | 12/2002 | Ciurczak | A61B 5/14532 600/316 |
| 2012/0027365 A1 | 2/2012 | Tatsuta et al. | |
| 2014/0021338 A1* | 1/2014 | Ohkubo | G01J 3/0254 250/216 |
| 2014/0362380 A1* | 12/2014 | Harada | G01N 21/251 356/402 |

FOREIGN PATENT DOCUMENTS

| | | |
|---|---|---|
| JP | 2006-23284 A | 1/2006 |
| JP | 2010-261847 A | 11/2010 |
| JP | 2012-27353 A | 2/2012 |
| WO | 0216905 A2 | 2/2002 |

OTHER PUBLICATIONS

International Search Report for PCT/JP2014/059660 dated Jul. 8, 2014 [PCT/ISA/210].
Written Opinion for PCT/JP2014/059660 dated Jul. 8, 2014. [PCT/ISA/237].

* cited by examiner

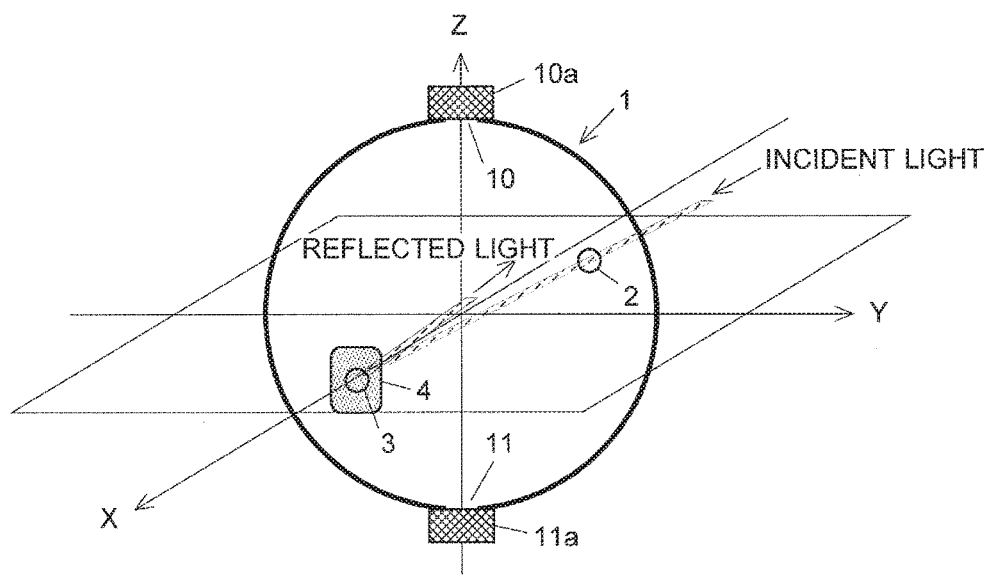
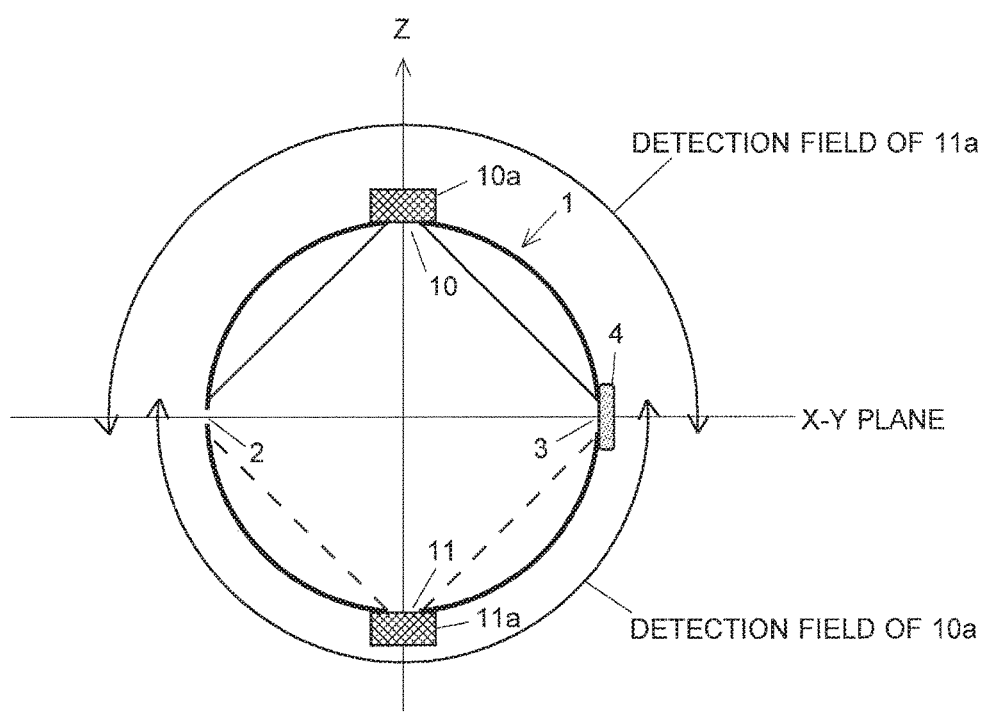

SPECTROMETER AND INTEGRATING SPHERE

CROSS REFERENCE TO RELATED APPLICATIONS

This application is a National Stage of International Application No. PCT/JP2014/059660, filed on Apr. 1, 2014, the contents of all of which are incorporated herein by reference in their entirety.

TECHNICAL FIELD

The present invention relates to an integrating sphere used in a spectrometer or similar device, as well as a spectrometer using such an integrating sphere. More specifically, it relates to an integrating sphere that can be suitably used in the case of performing a spectrometric measurement using a plurality of detectors, as well as a spectrometer provided with such an integrating sphere.

BACKGROUND ART

In the case where a measurement of light reflected by or transmitted through a sample is performed with a spectrometer, if the light is diffuse light, an integrating sphere is used to maximally introduce the light from the sample into a detector. An integrating sphere has a light entrance window and light detection window. The light from the sample is introduced through the light entrance window into the integrating sphere. This sphere internally has a reflection surface with a high level of reflectance. The light which has entered the integrating sphere is reflected by the inner surface of the integrating sphere, to eventually pass through the light detection window and fall onto the detector (a portion of the light directly reaches the detector). In the case where the irradiation of a sample with light is performed via the integrating sphere, a light introduction window is additionally formed in the integrating sphere, allowing light from an external source to be introduced through this light introduction window into the sphere and cast onto the sample.

In the case of performing a spectrometric measurement over a wide range of wavelengths, two or more types of detectors having different wavelength-sensitivity characteristics are normally used. Conventionally, two types of detectors have been used for such purposes, i.e. a PMT detector, which has a high level of sensitivity to ultraviolet-visible light, and a PbS detector, which has a high level of sensitivity to near infrared radiation.

FIGS. 1 and 2 show an integrating sphere 1 with a light introduction window, which allows for the use of two types of detectors and has the following elements arranged: a light introduction window 2, light entrance window 3, two light detection windows 10 and 11, as well as two detectors 10a and 11a. As shown in FIG. 1, a light entrance window 3 is formed in the integrating sphere 1. With the straight line connecting the center of the integrating sphere 1 and the light entrance window 3 defined as the X axis, and one arbitrary straight line which passes through the center of the integrating sphere 1 perpendicularly to the X axis defined as the Z axis, the light detection windows 10 and 11 are placed at the points of intersection of the Z axis and the integrating sphere 1 (these points are hereinafter called the "polar points"), with the detectors 10a and 11a placed on the outside of the light detection windows. With the axis passing through the center of the integrating sphere 1 perpendicularly to both of the X and Z axes defined as the Y axis, the light introduction window 2 is placed at a position on the X-Y plane opposite from the light entrance window 3 with respect to the center of the integrating sphere 1, being slightly displaced from the point of intersection of the X axis and the integrating sphere 1. This displacement is made in order that the directly reflected (mirror-reflected) ray of the light which is reflected by the surface of the sample 4 and enters the light introduction window 2 to the outside.

The light which has been generated from the light source and has entered the integrating sphere 1 through the light introduction window 2 is cast onto the sample surface through the light entrance window 3. After undergoing absorption at specific wavelengths to the sample, the light is reflected through the light entrance window 3 into the integrating sphere 1. After being reflected on the inner surface of the integrating sphere 1, the light falls onto the detectors through the light detection windows (a portion of the light directly reaches those detectors). The intensity of the reflected light changes with the reflection angle, with its intensity distribution expressed as a cosine distribution which is symmetrical with respect to the X-Y plane. Since the two types of detectors 10a and 11a located at the two polar points have symmetrical detection fields with respect to the X-Y plane, the detection surfaces of the detectors 10a and 11a receive light from the detection fields which have equal intensity distributions of the diffuse reflected light. Therefore, when the measurement of the diffuse reflected light is performed with the wavelength of the incident light gradually changed, no discrepancy in the detection result ("measurement discrepancy") occurs when the detectors 10a and 11a are switched taking into account their wavelength-sensitivity characteristics.

CITATION LIST

Patent Literature

Patent Literature 1: JP 2006-23284 A

SUMMARY OF INVENTION

Technical Problem

FIG. 3A shows the wavelength-sensitivity characteristics of a PMT detector and PbS detector. As can be seen in the figure, both PMT and PbS detectors have low levels of sensitivity to the light within a wavelength range around 900 nm in which the two detectors are switched. To overcome this problem, the idea of using three types of detectors including an InGaAs detector which has a high level of sensitivity to the light in the aforementioned wavelength range has been proposed (Patent Literature 1). With this system, a wide range of wavelengths of light from 150 nm to 3000 nm can be detected with high levels of sensitivity, as shown in FIG. 3B.

In the case of using three types of detectors 10a, 11a and 12a, two detectors 10a and 11a can be placed at the aforementioned polar points, whereas the remaining detector 12a must be arranged at a position different from the polar points. FIG. 4 shows one example, in which the third detector 12a is placed at a light detection window 13 formed at a position displaced from the polar points toward the side where the sample 4 is located. In this case, the intensity distribution of the diffuse reflected light within the detection field of the detector 12a is not equal to the intensity distribution within the detection fields of the two other detectors 10a and 11a. In other words, the light incident on the detection surface of the third detector 12a originates from a detection field where the light has a different intensity distribution from the light incident on the two other detectors 10a and 11a. Therefore, a measurement discrepancy occurs when the detector used for the measurement is switched from the first detector 10a, or second detector 11a, to the third one 12a.

The problem to be solved by the present invention is to provide an integrating sphere and spectrometer which is configured to reduce the measurement discrepancy which occurs when light emitted from a sample is detected with a plurality of detectors via the integrating sphere.

Solution to Problem

The integrating sphere for a spectrometer according to the present invention developed for solving the previously described problem includes:

a) an integrating spherical body with a light entrance window for allowing an entry of light emitted from a sample, a first light detection window, and a second light detection window;

b) a first detector attachment section located on the outside of the first light detection window; and c) a second detector attachment section located on the outside of the second light detection window in such a manner that the detection field of a detector to be attached to the second detector attachment section coincides with the detection field of a detector to be attached to the first detector attachment section.

Each of the windows may be either a simple through hole or an opening covered with a plate made of a material that allows the passage of light within a range of wavelengths that need to be detected.

In the integrating sphere according to the present invention, the detector attached to the first detector attachment section and the one attached to the second detector attachment section have the same detection fields. Accordingly, the two detectors attached to the integrating sphere according to the present invention receive light from the detection fields which have equal intensity distributions, so that the measurement discrepancy which occurs when the two detectors are switched is reduced.

In the integrating sphere according to the present invention, the first detector attachment section and/or the second detector attachment section may preferably be provided with a position adjuster for adjusting the position of the detectors so as to make the detection fields of the detectors attached to the first detector attachment section and the second detector attachment section coincide with each other.

The position adjuster may be a mechanism for providing a larger attachment distance from the outer surface of the integrating sphere for the detector having a larger detection angle among the detectors attached to the first and second attachment sections, or a mechanism for providing a smaller attachment distance from the outer surface of the integrating sphere for the detector having a smaller detection angle. With this configuration, even in the case of using two types of detectors having different viewing angles, their detection fields can be made to coincide with each other to reduce the measurement discrepancy.

The present invention also provides a spectrometer including any of the previously described modes of the integrating sphere with a detector attached to each detector attachment section. For example, a PMT detector, InGaAs detector and PbS detector can be used as the detectors.

Advantageous Effects of the Invention

In the integrating sphere according to the present invention, the detector attached to the first detector attachment section and the one attached to the second detector attachment section have the same detection fields. Accordingly, the two detectors attached to the integrating sphere according to the present invention receive light from the detection fields which have equal intensity distributions, so that the measurement discrepancy which occurs when the two detectors are switched is reduced.

BRIEF DESCRIPTION OF DRAWINGS

FIG. 1 is a configuration diagram showing the main components of a spectrometer including a conventional integrating sphere.

FIG. 2 is a diagram illustrating the arrangement of the detectors in a spectrometer including a conventional integrating sphere.

DESCRIPTION OF EMBODIMENTS

An embodiment of the spectrometer including an integrating sphere according to the present invention is hereinafter described with reference to FIGS. 5-8.

Figure 5:
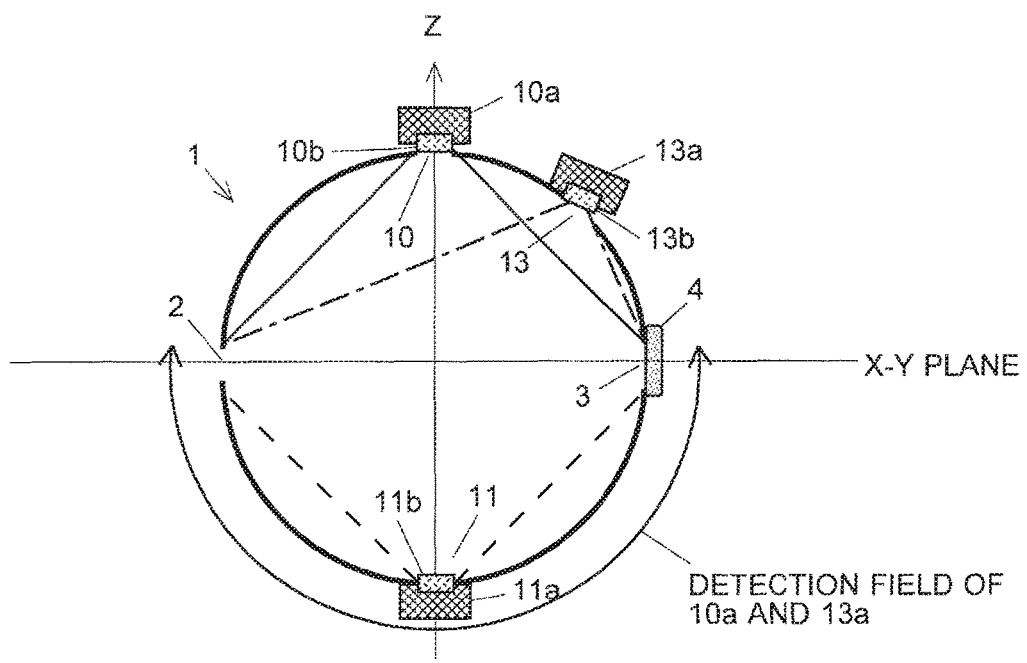
FIG. 5 a configuration diagram showing the main components of a spectrometer including an integrating sphere according to the present invention.
Figure 6:
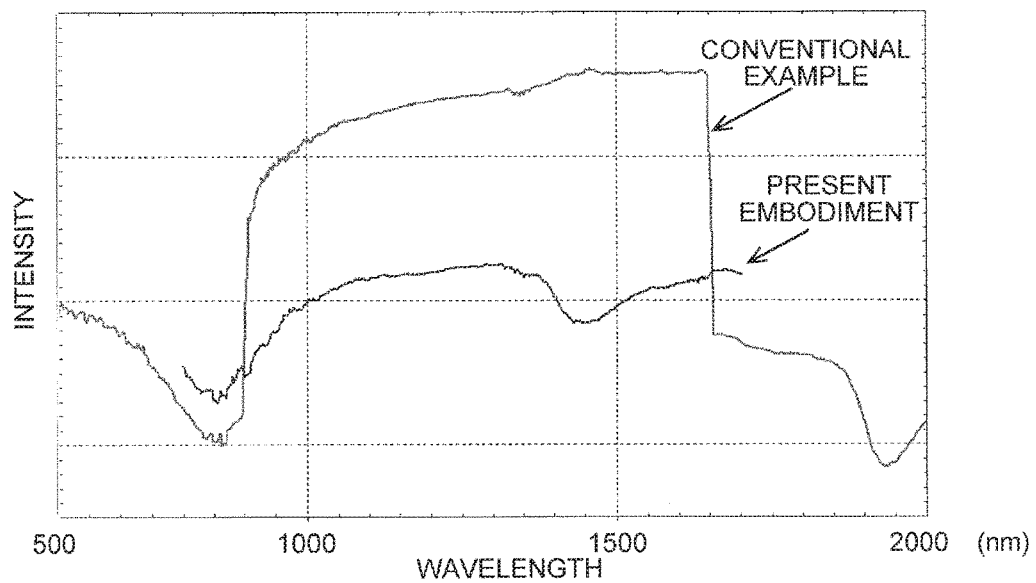
FIG. 6 is a diagram showing a comparison of the measurement discrepancy between the case where the spectrometer of the present embodiment is used and the case where a conventional spectrometer is used.

FIG. 5 shows the configuration of the main components of one embodiment of the spectrometer including an integrating sphere according to the present invention. The present embodiment is a spectrometer in which light generated from a light source outside the integrating sphere is introduced through a light introduction window 2 into the sphere to irradiate a sample 4 with the light and detect diffuse light reflected by the sample 4. In the present embodiment, the X, Y and Z axes are defined in a similar to the previously described example, with the points of intersection of the Z axis and the integrating sphere referred to as the "polar points".

In the spectrometer of the present embodiment, the integrating sphere is provided with a light introduction window 2, light entrance window 3, as well as three light detection windows 10, 11 and 13. First, second and third detector attachment sections 10b, 13b and 11b are provided at the three light detection windows. The light detection windows 10 and 11 are located at the polar points, while the light detection window 13 is formed at a position displaced from the polar points toward the side closer to the sample 4. The first, second and third detectors 10a, 13a and 11a are attached to the first, second and third detector attachment sections 10b, 13b and 11b, respectively.

Figure 3A:
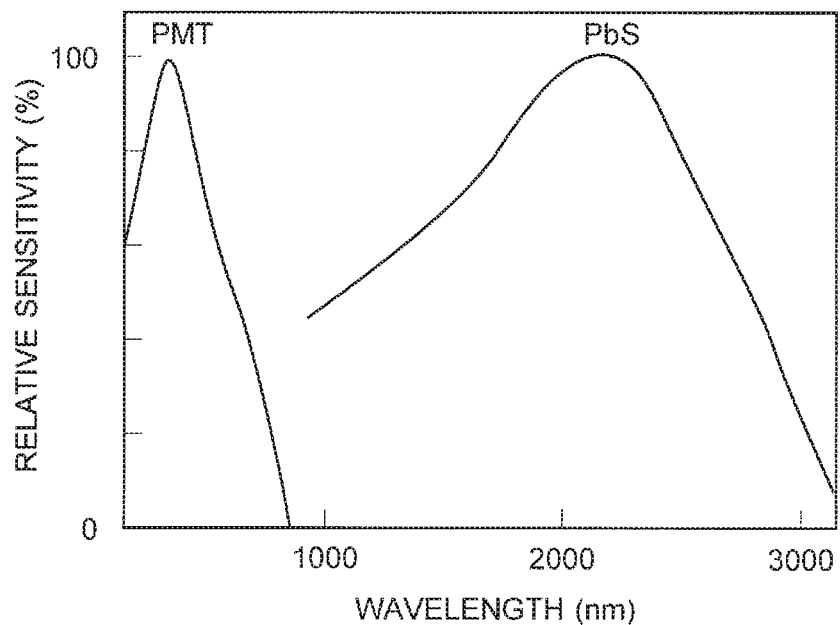
FIGS. 3A and 3B are diagrams showing the wavelength-sensitivity characteristics of a PMT detector, PbS detector and InGaAs detector.
Figure 3B:
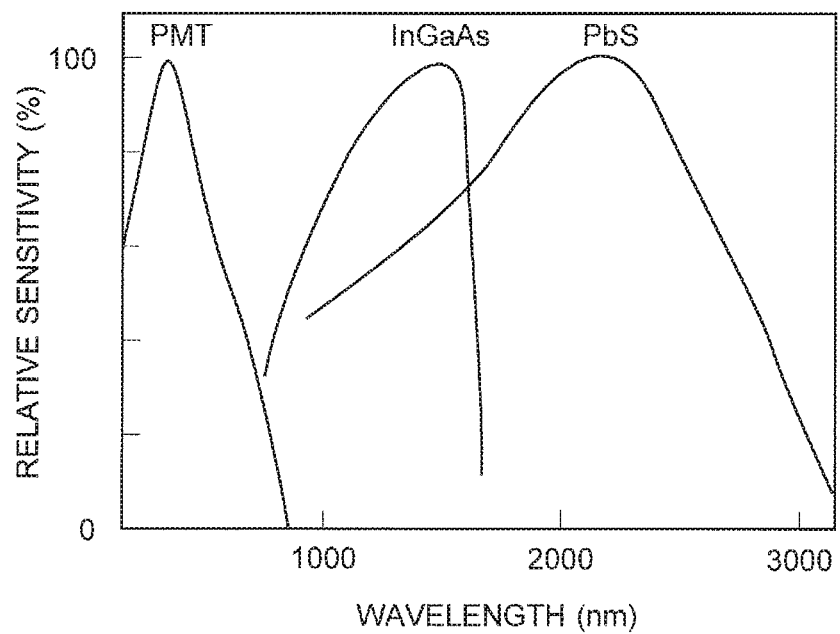
Figure 4:
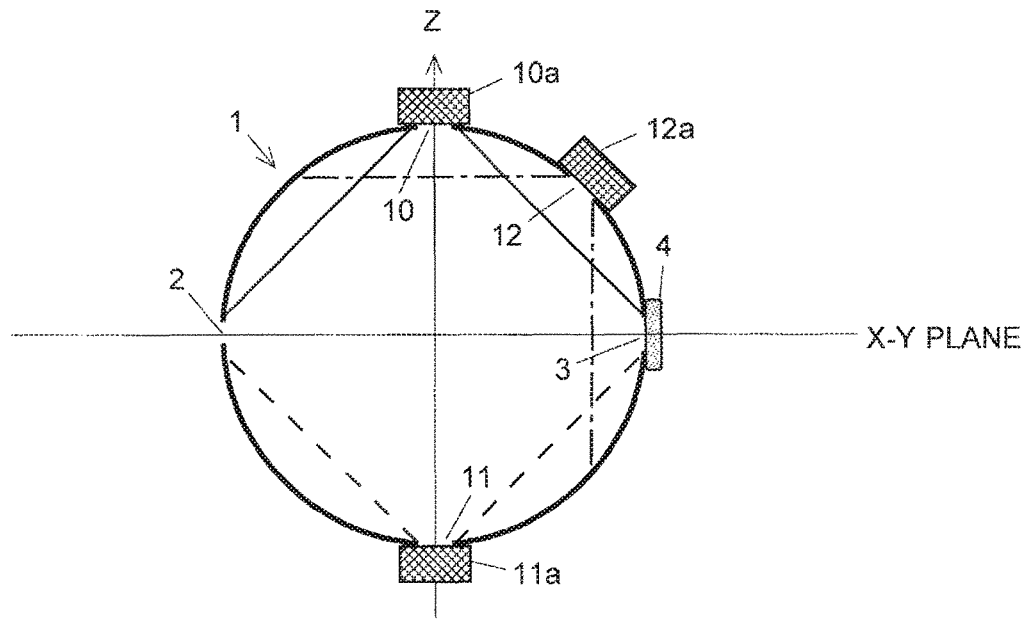
FIG. 4 is a diagram illustrating the detection fields of the detectors in a spectrometer including a conventional integrating sphere.

The spectrometer of the present embodiment is characterized in that the detector attachment sections allow the direction of the detector attached to each attachment section to be freely changed. In the spectrometer of the present embodiment, this feature is utilized so as to make the detection field of the first detector 10a attached to the first detector attachment section coincide with that of the second detector 13a attached to the second detector attachment section 13b. In the present embodiment, only the second detector 13a at the second detector attachment section 13b is attached in a different direction from the conventional case (FIG. 4). It is also possible to change the attachment direction of the detectors at both the first and second detector attachment sections 10b and 13b so as to make the detection fields of the two detectors 10a and 13a attached to the two attachment sections coincide with each other. As already explained with reference to FIG. 2, the detection field of the third detector 11a attached to the third detector attachment section 11b is equal to the detection field of the first detector 10a.

As just described, the detection fields of the first detector 10a and the second detector 13a in the present embodiment are made to coincide with each other, so that these detectors receive light from detection fields having equal intensity distributions. Therefore, the measurement discrepancy becomes smaller than in the case of a conventional spectrometer in which the intensity of the light from a sample is measured with a detector located at a position different from the polar points. Although three detectors are used in the present embodiment, the number of detectors may be arbitrarily changed, because the position of the detector attachment sections in the integrating sphere according to the present invention is not limited to the polar points.

The measurement discrepancy which occurs when the detectors are switched in the spectrometer of the present embodiment has been investigated and compared with the measurement discrepancy which occurs in a conventional spectrometer. In any of these spectrometers, three types of detectors (PMT detector, InGaAs detector and PbS detector) were used and the detector-switching operation was performed at wavelengths of 830 nm and 1650 nm. The result shown in FIG. 6 demonstrates that the measurement discrepancy can be dramatically reduced by using the spectrometer present embodiment.

Figure 7A:
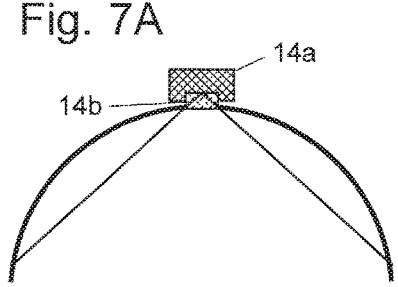
FIGS. 7A and 7B are diagrams illustrating one embodiment of the detector attachment section having a position adjuster.
Figure 7B:
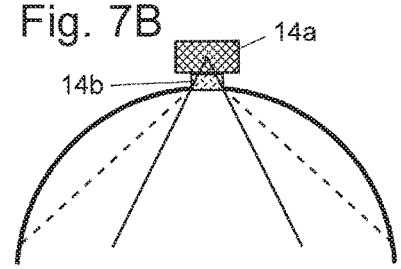
Figure 8:
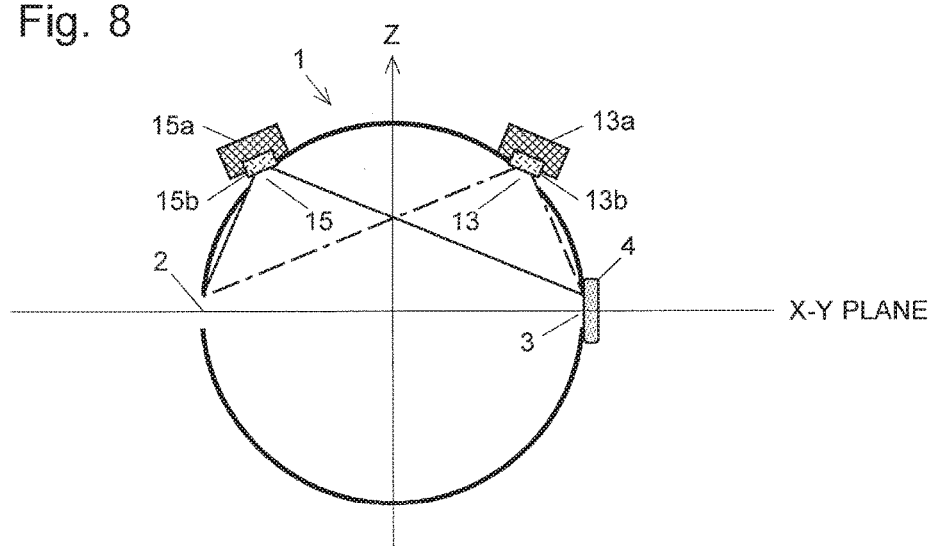
FIG. 8 is a diagram illustrating a variation of the integrating sphere according to the present invention.

In the previous embodiment, detectors with the same viewing angles are used. It is also possible to use a plurality of detectors having different detection angles. In this case, a detector attachment section having a position adjuster for adjusting the position of the detector is used in order to make the detection fields of the detectors coincide with each other. FIGS. 7A and 7B show one example of the detector attachment section 14b having the position adjuster. Specifically, FIG. 7A shows the detection angle of the detector 14a attached in the same manner as in the previous embodiment, while FIG. 7B shows the detection angle of the detector 14a attached at a farther position from the outer surface of the integrating sphere. As can be seen in FIGS. 7A and 7B, the effective detection angle can be changed by moving the detector 14a closer to or farther from the outer surface of the integrating sphere using the position adjuster. With this mechanism, the detection fields of a plurality of types of detectors can be made to coincide with each other even those detectors have different detection angles.

The previous embodiments are mere examples and can be appropriately changed within the spirit of the present invention.

The previously described embodiment is concerned with the case where the attachment sections are configured so that the direction of the detector attached to each attachment section is freely changeable (moveable). If the types of detectors to be used are previously specified, the detector attachment sections may be configured so that the detectors attached to those sections will be fixed in such directions where their detection fields coincide with each other.

In the previously described embodiment, at least one detector attachment section is provided at one of the polar points. However, it is not always necessary to provide the detector attachment sections at the polar points. For example, it is possible to provide detector attachment sections as indicated by numerals 13b and 15b in FIG. 8, with the detectors 13a and 15a attached as shown.

The previously described embodiment is a spectrometer in which light generated from a light source outside the integrating sphere is introduced through a light introduction window to irradiate a sample with the light and detect diffuse light reflected by the sample. However, the integrating sphere according to the present invention can be used in various forms of spectrometers, such as a spectrometer in which light generated from a light source outside the integrating sphere is cast onto a sample and the light transmitted through the sample is introduced into the integrating sphere and thereby detected, as well as a spectrometer in which the light source is located within the integrating sphere. Depending on the configuration of the spectrometer, an integrating sphere with no light introduction window 2 is appropriately used.

REFERENCE SIGNS LIST

1 . . . Integrating Sphere
2 . . . Light Introduction Window
3 . . . Light Entrance Window
4 . . . Sample
10, 11, 12, 13, 14, 15 . . . Light Detection Window
10a, 11a, 12a, 13a, 14a, 15a . . . Detector
10b, 11b, 12b, 13b, 14b, 15b . . . Detector Attachment Section

The invention claimed is:
1. An integrating sphere for a spectrometer, comprising:
a) an integrating spherical body with a light entrance window for allowing light emitted from a sample to enter an inner space of the integrating spherical body;
b) a first detector attached to the integrating spherical body on an outside of a first detection window provided at one of two points of intersection of the integrating spherical body and a second straight line passing through a center of the integrating spherical body in a direction orthogonal to a first straight line passing through the light entrance window and the center;
c) a second detector attached to the integrating spherical body on an outside of a second detection window provided at another one of the two points of intersection; and
d) a third detector attached to the integrating spherical body on an outside of a third detection window provided on the integrating spherical body in such a manner that a normal to a detection surface of the third detector passes through either the first detection window or the second detection window.

2. The integrating sphere for a spectrometer according to claim 1, wherein at least one of the first, second and third detectors is provided with a position adjuster for adjusting a position of the detectors.

3. The integrating sphere for a spectrometer according to claim 1, wherein the normal to the detection surface of the third detector passes through one of the first and second detection windows located at a greater distance from the third detection window.

4. The integrating sphere for a spectrometer according to claim 1, further comprising:
 e) a light source for casting light to the light entrance window along an optical path which does not pass through the center of the integrating spherical body.

5. The integrating sphere for a spectrometer according to claim 4, wherein a plane including the center of the integrating spherical body and the optical path is perpendicular to the second straight line.

6. The integrating sphere for a spectrometer according to claim 4, wherein:
 the light source is located outside the integrating spherical body; and
 the integrating spherical body is provided with a light introduction window for introducing light from the light source into the inner space of the integrating spherical body.

7. A spectrometer including an integrating sphere, the integrating sphere comprising:
 a) an integrating spherical body with a light entrance window for allowing light emitted from a sample to enter an inner space of the integrating spherical body;
 b) a first detector attached to the integrating spherical body on an outside of a first-detection window provided at one of two points of intersection of the integrating spherical body and a second straight line passing through a center of the integrating spherical body in a direction orthogonal to a first straight line passing through the light entrance window and the center;
 c) a second detector attached to the integrating spherical body on an outside of a second detection window provided at another one of the two points of intersection; and
 d) a third detector attached to the integrating spherical body on an outside of a third detection window provided on the integrating spherical body in such a manner that a normal to a detection surface of the third detector passes through either the first detection window or the second detection window.

8. The spectrometer according to claim 7, wherein at least one of the first, second and third detectors is provided with a position adjuster for adjusting a position of the detector.

9. The spectrometer according to claim 7, wherein the normal to the detection surface of the third detector passes through one of the first and second detection windows located at a greater distance from the third detection window.

10. The spectrometer according to claim 7, further comprising:
 e) a light source for casting light to the light entrance window along an optical path which does not pass through the center of the integrating spherical body.

11. The spectrometer according to claim 10, wherein a plane including the center of the integrating spherical body and the optical path is perpendicular to the second straight line.

12. The spectrometer according to claim 10, wherein:
 the light source is located outside the integrating spherical body; and
 the integrating spherical body is provided with a light introduction window for introducing light from the light source into the inner space of the integrating spherical body.

\* \* \* \* \*